H. P. KRAFT.
DUST CAP.
APPLICATION FILED DEC. 17, 1914.

1,201,198.

Patented Oct. 10, 1916.

WITNESSES:
J. Clyde Ripley
Fred White

INVENTOR:
Henry Phillip Kraft,
By Attorneys,
Fraser, Funk & Myers

UNITED STATES PATENT OFFICE.

HENRY PHILLIP KRAFT, OF RIDGEWOOD, NEW JERSEY.

DUST-CAP.

1,201,198.     Specification of Letters Patent.     Patented Oct. 10, 1916.

Application filed December 17, 1914. Serial No. 877,790.

*To all whom it may concern:*

Be it known that I, HENRY PHILLIP KRAFT, a citizen of the United States of America, residing at Ridgewood, in the county of Bergen and State of New Jersey, have invented certain new and useful Improvements in Dust-Caps, of which the following is a specification.

This invention relates to dust caps for tire valves, and aims to provide certain improvements therein.

In the common form of tire valve the casing of the valve extends inwardly through the rim, and it is customary to provide an elongated cap to inclose the projecting end of the valve to exclude dust and moisture, and to protect the valve.

According to the present invention, I provide a dust cap which is easily applied and removed, and which will adequately hold its position upon the valve in use.

Figure 1:
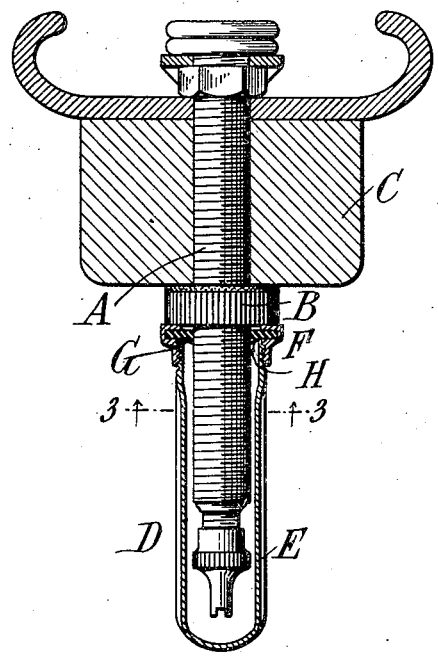
Figure 2:
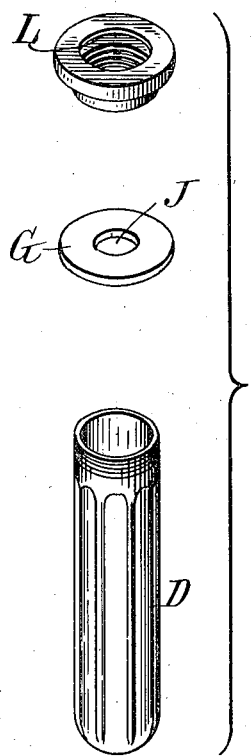
Figure 3:
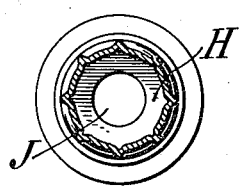
Figure 4:
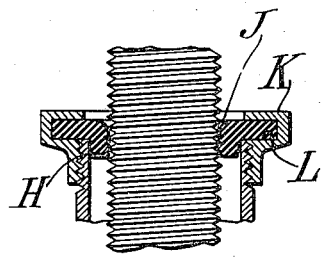

Referring to the drawings which illustrate one form of the invention, Figure 1 is a sectional view of a rim showing a tire valve in elevation and the dust cap in diametrical section. Fig. 2 is a perspective view of the parts of the dust cap detached. Fig. 3 is a cross section on the line 3—3 in Fig. 1. Fig. 4 is an enlarged detailed sectional view showing a portion of the cap in the act of applying same to the valve.

Referring to the drawings, let A indicate the casing of a common form of tire valve which is usually screw-threaded throughout its length to receive a clamping nut B which is screwed upon the valve until it reaches the felly C of the wheel rim, thus holding the valve rigidly in place.

D indicates the cap as a whole, which is formed of a more or less cylindrical shell E designed to fit over and inclose the projecting end of the tire valve, and a foot F which is adapted to make contact with the valve and hold the structure in place.

According to the present invention, the foot of the cap is provided with a washer G which is preferably formed of rubber or other flexible material. The washer G is so mounted in the cap as to leave its interior portion H free to flex as it passes along the screw-threads of the valve casing. The aperture J in the washer is of smaller diameter than the diameter of the valve casing, so that the washer must submit to a certain degree of flexure in applying it to the casing. This is best shown in Fig. 4, which illustrates the position of the washer when the cap is being pressed toward the rim nut B in the act of applying the cap. When the cap has been pressed down as far as possible, it is given a few turns, with the effect that the flexed portion H moves toward the rim nut and holds the cap securely in place with its foot against the nut.

An important feature of the invention is the method of securing the washer to the foot of the cap. This may be accomplished in various ways, but it is very desirable that a large part of the margin of the washer shall be engaged by the cap. In the construction shown, the foot of the cap is formed with a collar K which is formed with a deep annular recess L designed to receive the marginal portions of the washer. Preferably the interior of the collar is screw-threaded to receive the exterior of the shell E, and the construction is preferably such that the bottom of the shell will press against the surface of the washer when the sleeve is screwed on the shell. By this construction the washer is securely held in place and will not strip from the cap during the operation of applying it to or removing it from the valve.

While I have shown and described one form of the invention, it is understood that I do not wish to be limited thereto, as various changes may be made therein without departing from the spirit of the invention.

What I claim is:

1. A dust cap for tire valves or the like, comprising an elongated shell adapted to fit over the valve casing, said shell having a foot portion, and a washer of flexible material held in said foot portion, and adapted to hold the cap in place by engagement with said casing.

2. A dust cap for tire valves or the like, comprising an elongated shell adapted to fit over the valve casing, said shell having a foot portion, and a washer of flexible material held in said foot portion, said washer having its inner marginal surface unsupported and being adapted to flex as it passes along the valve casing, and said washer being adapted to hold the cap in place by engagement with said casing.

3. A dust cap for tire valves or the like, comprising an elongated shell adapted to fit over the valve casing, said shell having a foot portion, said foot portion having a recess, and a washer of flexible material having its outer marginal edges in said recess.

4. A dust cap for tire valves or the like, comprising an elongated shell adapted to fit over the valve casing, and said shell having a foot portion, said foot portion comprising a sleeve adapted to screw on said shell, said sleeve having an interior recess, and a washer of flexible material having its outer marginal portions in said recess.

5. A dust cap for tire valves or the like, comprising an elongated shell adapted to fit over the valve casing, and said shell having a foot portion, said foot portion comprising a sleeve adapted to screw on said shell, said sleeve having an interior recess, and a washer of flexible material having its outer marginal portions in said recess, and said shell being adapted to compress said washer in said recess.

In witness whereof, I have hereunto signed my name in the presence of two subscribing witnesses.

HENRY PHILLIP KRAFT.

Witnesses:
E. V. MYERS,
FRED WHITE.